Dec. 3, 1968
M. H. GREENWOOD
3,414,008
PRESSURE OPERATED VALVE
Filed Sept. 15, 1966
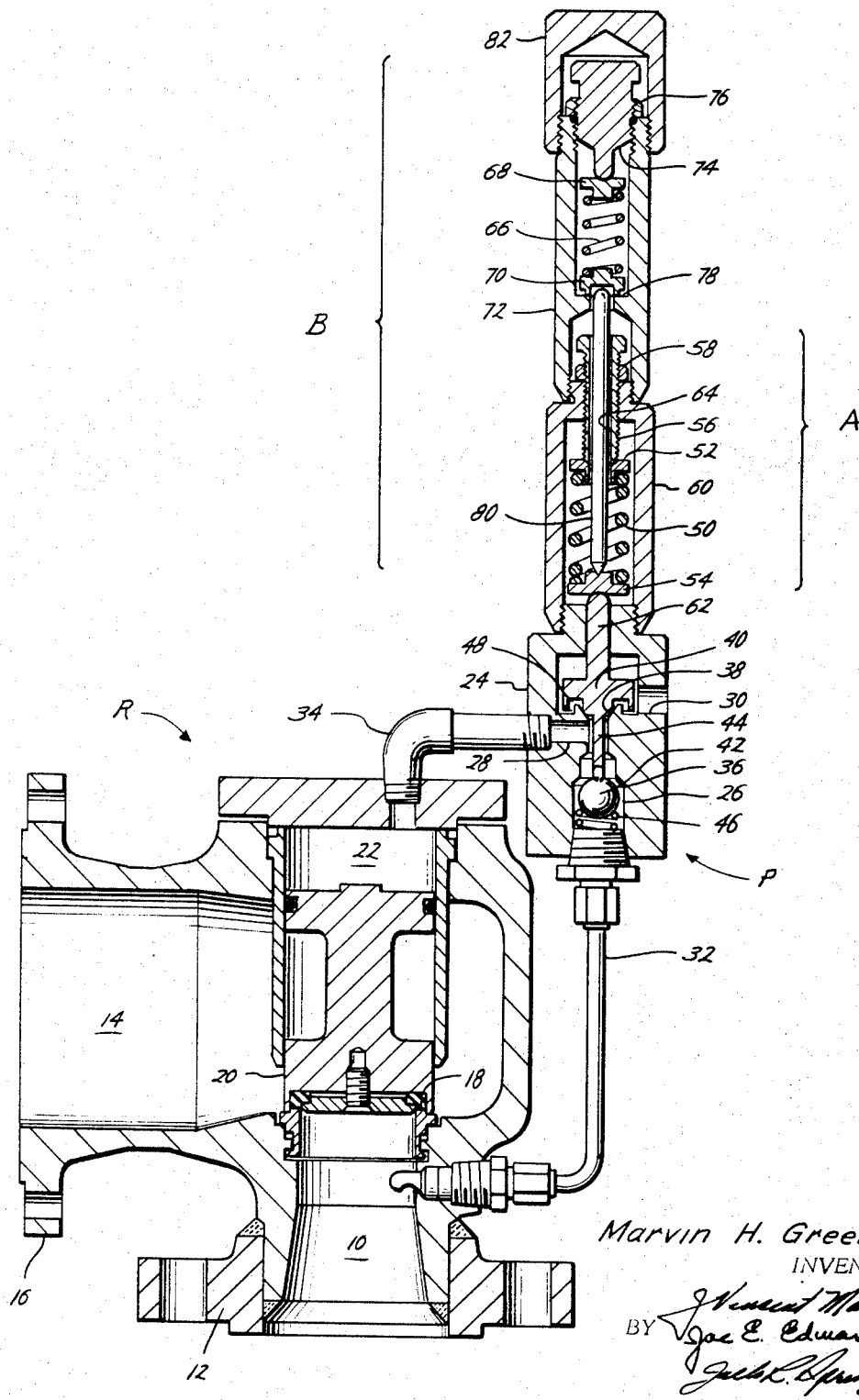
Marvin H. Greenwood
INVENTOR.
BY
ATTORNEYS

United States Patent Office 3,414,008
Patented Dec. 3, 1968

3,414,008
PRESSURE OPERATED VALVE
Marvin H. Greenwood, Houston, Tex., assignor to Anderson, Greenwood & Co., Bellaire, Tex., a corporation of Texas
Filed Sept. 15, 1966, Ser. No. 579,747
10 Claims. (Cl. 137—492)

The present invention generally relates to an improved pilot valve and more specifically to a three-way pilot valve suitable for controlling a relief valve and having an improved adjustment for controlling the amount of blowdown of the relief valve independent of the relieving pressure of the relief valve.

The present invention is an improvement in the pilot valve structure disclosed in the pending application Ser. No. 482,465 of Irvin B. Weise, filed Aug. 25, 1965, now abandoned. The pilot valve disclosed in such application provides a means of separately controlling the blowdown of the main valve independent of the pressure setting at which the pilot valve opens to bleed pressure from the actuator of the main relief valve. Such structure provides a ball valve spaced from the pilot valve member by a plunger. The ball valve is adapted to engage the seat to close communication between the inlet to the main pilot valve and the line to the main valve actuator and the position of such seat is made adjustable to control the amount of blowdown without affecting the opening pressure of the main pilot valve. While such device has proven very satisfactory in operation, it is expensive to manufacture because of the intricate machining necessary to make the ball seat position adjustable and to provide pressure seals.

It is therefore an object of the present invention to provide a simplified pilot valve structure which controls blowdown; such structure eliminating the seals and the adjusting movement of the seat.

Another object is to provide a pilot valve having separate means for adjusting blowdown which coacts with the means adjusting the opening pressure of the pilot valve in a manner that the pilot valve adjusting means controls opening pressure and the combined blowdown and pilot valve adjusting means control the closing of the pilot valve.

A further object is to provide a pilot valve with a first adjustable spring to control the opening pressure of the pilot valve and a second adjustable spring which becomes effective to coact with the first adjustable spring to control the closing of the pilot valve without affecting the opening setting of the pilot valve.

These and other objects and advantages of the present invention are hereinafter described in the following specification and claims, together with the details of structure disclosed in the drawings wherein:

The figure is a sectional view of a relief valve controlled by the improved pilot valve of the present invention.

Referring to the drawing, the relief valve R includes an inlet 10 surrounded by the flange 12 or other suitable means for connecting the relief valve R to a pressure system whose pressure is to be controlled, the outlet 14 which is also surrounded by a flange 16 for suitable connection if desired to a piping system to vent the fluids passing from the relief valve R, a valve seat 18 surrounding the flow passageway through the relief valve and a combined piston and valve member 20 which is adapted to engage the seat 18 to close communication through the valve and which operates responsive to pressures in the cylinder 22 and in the inlet 10.

The pressure in the cylinder 22 is controlled by the pilot valve assembly P and the pilot valve assembly P includes the body 24 which defines the inlet port 26, the control port 28 and the outlet port 30. Pressure fluid from the inlet 10 of relief valve R is conducted by the duct 32 to the inlet port 26 and is conducted between the control port 28 and the cylinder 22 by the duct 34. The inlet port 26 is in communication with the control port 28 through the valve seat 36 and communication is established between the control port 28 and the outlet port 30 through the valve seat 38. The pilot valve 40 is movably mounted within the body 24 and adapted to move into seating engagement with the seat 38 to close communication between control port 28 and outlet port 30. The ball valve 42 is also movably mounted in the body 24 and adapted to seat on the seat 36 to close communication between inlet port 26 and control port 28. A means is provided connecting between the pilot valve 40 and the ball valve 42 such as the rod extension 44 which has sufficient length to unseat the ball 42 whenever the pilot valve 40 is seated on the seat 38. The spring 46 is mounted in the body to lightly urge the ball 42 toward engagement with the seat 36. When pilot valve 40 opens, ball valve 42 then seats on seat 36.

The pilot valve configuration provides the usual huddling chamber 48 to increase the effective pressure area once the pilot valve has become at least partially unseated whereby the pilot valve then moves to a fully open position and allows the ball valve 42 to engage the seat 36. From this, it can be seen that when the pilot valve 40 is seated on the seat 38, the ball 42 will be unseated to provide communication from relief valve inlet 10 through the duct 32, the inlet port 26, the control port 28, the duct 34 to conduct inlet fluid pressure into the chamber 22. Because the effective area of the combined piston and valve member in the cylinder 22 is larger than the area of the member exposed to inlet pressure, the valve member 20 remains on the seat 18 whenever inlet 10 and cylinder 22 are in communication through the pilot valve assembly P. When the pilot valve 40 opens, the ball valve 42 seats closing this communication between the inlet 10 and the cylinder 22. Additionally, the opening of the pilot valve 40 provides a communication from the cylinder 22 to the outlet port 30 allowing the fluids within the cylinder 22 to be vented through the pilot valve assembly P. When vented, the fluid pressure within the inlet 10 is sufficient to unseat the valve member 20 allowing the fluids under pressure to be vented through the relief valve R and discharged from the outlet 14. The pilot valve 40, therefore, opens responsive to the pressure within the inlet 10 of the relief valve R since the underside of the pilot valve 40 when closed on the seat 38 is exposed to the fluid pressure from the inlet 10.

To control the pressure at which pilot valve 40 opens, an opening control means A is provided to exert a force on the pilot valve 40. Such means A includes the spring 50 having upper and lower spring followers 52 and 54 and adjusting means such as adjusting screw 56 and lock nut 58, all of which are mounted in the cage 60 which is secured to the body 24. The extension 62 of the pilot valve 40 slides through the upper end of the body 24 into engagement with the lower follower 54 whereby the force of the spring 50 is exerted to bias the pilot valve 40 toward seated position. The screw 56 extends in threaded engagement through the upper end of the cage 60 and engages the upper follower 52 to adjust the force exerted by the spring 50 on the pilot valve 40. It should be noted that the screw 56 is provided with the central bore 64 for the reasons hereinafter explained.

As previously mentioned, it is desirable to provide an additional force exerted on the pilot valve 40 to bias it toward seated position on the seat 38, which force is not exerted on the pilot valve 40 during initial opening. Such force is provided by the blowdown control means B. Means B includes a force exerting means and a connecting means. The force exerting means includes the spring 66 having upper and lower followers 68 and 70 which are mounted within the cage 72 and the adjusting means, such as screw 74 and the lock nut 76. The cage 72 is threadedly secured onto the upper end of the cage 60 as shown, and defines an internal shoulder 78 which the lower follower engages when the pilot 40 is in engagement with the seat 38. The connecting means includes the pusher rod 80 which extends from engagement with the lower follower 54 through spring 50, the bore 64 of the screw 56, and with the pilot 40 in seated position, terminates short of engagement with the lower follower 70 as shown. The pusher rod 80 is adapted to engage the lower side of the lower follower 70 whenever the pilot valve 40 becomes unseated. The lost motion in the spaced relationship of the upper end of the pusher rod 80 to the lower follower 70 is very slight since once the pilot valve 40 becomes at least partially unseated, the pressure area of the huddling chamber is effective to overcome the forces of both means A and B to move the pilot valve 40 to open position. At this time, the means A and B coact to exert a combined force biasing the pilot valve 40 towards its seated position. A suitable cover T8 is threaded onto cage 72 to protect the exposed portion of adjusting screws 74 and lock nut 76.

In operation with the relief valve R connected to a pressure system which is to be protected against over pressure, and with the pilot valve assembly P connected to relief valve R and including the separate pilot valve controlling means A and the blowdown control means B as shown, the combined piston and valve member 20 is in engagement with the seat 18 to close communication through the relief valve R. Under these conditions, the pilot valve 40 is seated on the seat 38 and the ball 42 is unseated from the seat 36. Thus, pressure fluids from inlet 10 are conducted through the duct 32 through the pilot valve assembly P, the duct 34 to the cylinder 22. As previously stated, the larger effective area of the cylinder 22 is sufficient to hold the valve member 20 closed against the pressure at the inlet 10 so long as such pressures are equalized through the pilot valve assembly P.

When the pressure in the system being protected increases, this pressure is transmitted from the inlet 10 to the pilot valve assembly and is exerted against the underside of the pilot valve 40. When this pressure has increased sufficiently so that the force under the pilot valve 40 responsive to such pressure is sufficient to overcome the force exerted on the pilot valve by the pilot valve opening control means A as adjusted by the position of the screw 56, the pilot valve commences to open. Immediately upon initial opening, the huddling chamber 48 is exposed to this fluid pressure and moves the pilot valve 40 upward to full open position, even though the force of the blowdown control means B is exerted against the opening of the pilot valve 40. This upward movement of the pilot valve causes the ball 42 to seat on the seat 36 thereby closing communication between the inlet 10 and the cylinder 22. The opening of the pilot valve 40 provides communication between the cylinder 22 and the outlet 30 of the pilot valve assembly to vent pressure fluid from the cylinder 22. The inlet pressure against the combined piston and valve member 20 is then sufficient to overcome the reduced pressure in the cylinder 22 to cause the member 20 to open allowing fluid pressure from the system to be vented through the relief valve R.

During blowdown, the fluid pressure at 10 is exerted against the ball 42 to hold the ball in seated position on the seat 36. Since the pressure of fluid in inlet 10 is being reduced by the blowdown of pressure fluids through the relief valve R, the force on the ball 42 is reduced correspondingly to the reduction in pressure at the inlet 10. The effective area of seat 36 is larger than the effective area of seat 38. When the force resulting from the pressure on ball 42 is less than the combined forces exerted on the pilot valve by the pilot valve control means A and the blowdown control means B less the small force exerted on ball 42 by the spring 46, the pilot valve moves towards closed position, thereby unseating the ball valve 42. Immediately that the ball valve 42 is unseated, the effective pressure area on the ball valve 42 is destroyed and the pilot valve moves to its fully closed or seated position on the seat 38. With valve 40 seated and ball 42 unseated, pressure fluid is again conducted from inlet 10 to chamber 22 causing member 20 to seat on seat 18 and thereby stopping the blowdown of fluids through relief valve R. The force of the springs 50 and 66 urging the pilot valve to seated position and to unseat the ball valve 42 is the combined preset forces plus the incremental increase in force resulting from the compression of the springs and dependent upon the spring rates of the respective springs. Clearly if the effective area of seat 36 is not larger than the effective area of seat 38, no appreciable blowdown occurs once the huddling chamber effect is reduced. The area of seat 36 should be preselected to provide the desired range of adjustment of blowdown, while the settings of the control means A and B are selected for each installation to provide the desired amount of blowdown.

From the foregoing, it can be seen that adjustable means have been provided to control the opening pressure for the pilot valve in a pilot assembly and an adjustable blowdown control means which coacts with the opening control means to exert a greater force on the pilot valve urging it towards closed position once the pilot valve has at least partially opened. In this manner, the amount of blowdown through the relief valve R is controlled since as soon as the ball valve 42 becomes unseated, fluid pressure from the inlet 10 is conducted through the pilot valve assembly into the cylinder 22 closing the combined piston and valve member 20 on to the seat 18 thereby terminating the blowdown through the relief valve R. The connecting means, which as shown is the pusher rod 80, is designed to prevent the exertion of the force from the blowdown control means when the pilot valve is seated so that the pilot valve opens responsive only to pressures which overcome the force exerted by the pilot valve opening control means A but once open, the combined forces of the means A and B are exerted on the pilot valve urging it towards closed position. The only force resisting this combined force is the pressure force on the ball valve 42 over its effective seat area, and such pressure is the pressure in the inlet 10 which is being reduced by blowdown. In the foregoing discussion the light force exerted by the spring 46 on ball valve 42 has been neglected for purposes of clarity; however, in actual practice this force is readily counterbalanced by the adjustment of the opening control means A.

Thus the device of the present invention provides a relatively simplified pilot valve assembly structure for controlling a relief valve which provides a separate control for the opening of the pilot valve and for controlling blowdown. In this manner the pilot valve may be closed to close the relief valve as soon as the pressure in the inlet 10 has reduced to a predetermined pressure below the original relieving pressure. Both the pressure at which the pilot valve opens and the pressure at which the pilot valve closes may therefore, be accurately and independently controlled with the device of the present invention.

The foregoing disclosure and description of the invention are illustrative and explanatory thereof, and various changes in the method as well as in the details of the illustrated construction, may be made within the scope of the appended claims without departing from the spirit of the invention.

What is claimed is:
1. A pilot valve assembly comprising,
a body,
said body defining an inlet port, a control port, an outleat port, a first valve seat between said inlet port and said control port and a second valve seat between said control port and said outlet port,
a pilot valve movably positioned within said body and adapted to seat on said second valve seat,
a second valve movably positioned within said body and adapted to seat on said first valve seat,
means connecting said pilot valve and said second valve to hold said second valve unseated when said pilot valve is seated,
means exerting a force on said pilot valve to bias said pilot valve toward seated position, and
blowdown control means exerting a force on said pilot valve only when the pilot valve is at least partially unseated to bias said pilot valve toward seated position.

2. A pilot valve according to claim 1 wherein,
the force of said force exerting means controls the opening of said pilot valve, and
the combined forces of said force exerting means and blowdown control means coact to control the seating of said pilot valve.

3. A pilot valve assembly according to claim 1, wherein
said force exerting means includes a first spring and a first adjusting means, and
said blowdown control means includes a second spring, a second adjusting means and means connecting said pilot valve to said second spring only when said pilot valve is at least partially unseated.

4. A pilot valve assembly according to claim 3 wherein said connecting means includes,
a pusher rod having one end normally operatively engaged with said pilot valve and the other end spaced from said second spring when said pilot valve is seated whereby the force of said second spring is exerted on said pilot valve only when said pilot valve has opened a sufficient distance to move said pusher rod into operative engagement with said second spring.

5. A pilot valve assembly comprising,
a body,
an inlet port in said body,
an outlet port in said body,
a control port in said body,
said inlet port being in communication with said control port through a first valve seat,
said control port beting in communication with said outlet port through a second valve seat,
a first valve means in said body and adapted to seat on said first valve seat to control flow from said inlet port to said control port,
a second valve means in said body and adapted to seat on said second valve seat to control flow from said control port to said outlet port,
means connecting said first and second valve means whereby only one of said valve means is seated at one time,
a first adjustable means biasing said second valve means toward its seated position and said first valve means toward its unseated position,
a second adjustable means biasing said second valve means toward its seat position and said first valve means toward its unseated position, and
means rendering said second adjustable means active to bias said second valve means toward its seated position only when said second valve means is at least partially unseated.

6. The pilot valve assembly according to claim 5 wherein,
said second valve means includes a huddling chamber to increase the effective pressure area on said second valve means when it has initially opened whereby sufficient force is available to move said second valve means to full open position against the forces of both said first and said second adjustable means.

7. A pilot valve assembly according to claim 5 wherein said last-named means comprises,
a lost motion connection between said valve means and said second adjustable means, whereby said lost motion connection isolates said valve means from the biasing force of said second adjustable means when said second valve means is seated.

8. A relief valve, comprising
a body defining a pressure chamber, an inlet, an outlet and a relief valve seat surrounding communication between said inlet and outlet,
valve means movably mounted in said body responsive to fluid pressure in said chamber and in said inlet for movement into engagement with said main valve seat,
a pilot valve assembly including a pilot valve body defining an inlet port, a control port, an outlet port, a first valve seat between said inlet port and said control port and a second valve seat between said control port and said outlet port,
means conducting pressure fluids from said relief valve inlet to said inlet port of said pilot valve,
means conducting pressure fluids between said pressure chamber and said control port of said pilot valve,
a pilot valve movably positioned within said body and and adapted to seat on said second valve seat,
a second valve movably positioned within said body and adapted to seat on said first valve seat,
means connecting said pilot valve and said second valve to hold said second valve unseated when said pilot valve is seated,
means exerting a force on said pilot valve to bias said pilot valve toward seated position, and
blowdown control means exerting a force on said pilot valve only when said pilot valve is at least partially unseated to bias said pilot valve toward seated position,
said pilot valve assembly directing pressure fluids from said relief valve inlet to said pressure chamber to hold said valve means in engagement with said relief valve seat when said pilot valve is in engagement with said second valve seat,
said pilot valve assembly venting pressure from said pressure chamber when said pilot valve is unseated from said second valve seat whereby said valve means unseats allowing blowdown of pressure fluids through said relief valve.

9. A relief valve according to claim 8 wherein,
said pilot valve defines a huddling chamber to increase the effective pressure area of said pilot valve when it has initially opened to cause said pilot valve to move rapidly to full open position against the combined forces of both of said force exerting means.

10. A relief valve, comprising
a body defining a pressure chamber, an inlet, an outlet and a main valve seat surrounding communication between said inlet and outlet,
means movably mounted in said body responsive to fluid pressure in said chamber and in said inlet for movement into engagement with said main valve seat,
a pilot valve including a pilot valve body, an adjustable opening control means and an adjustable blowdown control means,
means conducting pressure fluids from said inlet to said pilot valve,
duct means connecting said pressure chamber to said pilot valve, and
pilot valve means in said pilot valve body responsive to fluid pressure from said inlet, in one position directing pressure fluids from said inlet to said chamber and in the other position venting pressure fluids from said chamber, said adjustable opening control means exerting a force on said pilot valve means toward said one position, said blowdown control means exerting a force on said pilot valve means toward said one position only when said valve means has moved at least partially from said one position to said other position.

References Cited

UNITED STATES PATENTS

| | | | |
|---|---|---|---|
| 2,614,580 | 10/1952 | Cormier | 137—108 XR |
| 3,294,111 | 12/1966 | Abercrombie et al. | 137—492 |
| 3,304,951 | 2/1967 | Farris | 137—492 |

M. CARY NELSON, *Primary Examiner.*

R. J. MILLER, *Assistant Examiner.*